United States Patent
Nakazawa

(10) Patent No.: US 6,722,629 B1
(45) Date of Patent: Apr. 20, 2004

(54) FLOW CONTROL VALVE

(75) Inventor: Mistuhiro Nakazawa, Tokyo (JP)

(73) Assignee: Yugen Kaisha Kouritu, Tokyo (JP)

( * ) Notice: Subject to any disclaimer, the term of this patent is extended or adjusted under 35 U.S.C. 154(b) by 107 days.

(21) Appl. No.: 10/070,606

(22) PCT Filed: Jul. 10, 2000

(86) PCT No.: PCT/JP00/04585

§ 371 (c)(1),
(2), (4) Date: Mar. 8, 2002

(87) PCT Pub. No.: WO02/04850

PCT Pub. Date: Jan. 17, 2002

(51) Int. Cl.[7] .............................................. F16K 31/02
(52) U.S. Cl. ............................ 251/129.17; 251/129.19; 251/334
(58) Field of Search ....................... 257/129.17, 129.19, 257/331, 333, 334

(56) References Cited

U.S. PATENT DOCUMENTS

| | | | | |
|---|---|---|---|---|
| 4,790,346 A | * | 12/1988 | Kolze et al. | 251/129.19 |
| 5,145,152 A | | 9/1992 | Komuro et al. | 251/331 |
| 5,209,455 A | * | 5/1993 | Uetsuhara et al. | 251/129.19 |
| 5,265,841 A | * | 11/1993 | Abrahamsen et al. | 251/129.19 |
| 5,709,370 A | * | 1/1998 | Kah, Jr. | 251/129.19 |
| 5,730,423 A | | 3/1998 | Wu et al. | 251/331 |
| 6,311,951 B1 | * | 11/2001 | Samulowitz | 251/129.16 |

FOREIGN PATENT DOCUMENTS

| | | |
|---|---|---|
| DE | 198 46 841 A1 * | 10/1998 |
| JP | 153019/1979 | 10/1979 |
| JP | 132182/1990 | 11/1990 |
| JP | 29787/1991 | 3/1991 |
| JP | 06-047007 | 2/1994 |
| WO | WO 02/04850 | 1/2002 |

OTHER PUBLICATIONS

International Search Report PCT/JP00/04585.

* cited by examiner

Primary Examiner—John Bastianelli
(74) Attorney, Agent, or Firm—Rader, Fishman & Grauer PLLC

(57) ABSTRACT

A flow control valve capable of increasing a delivery flow rate gradually with a simple structure, comprising a flowout port (26) to deliver a pressure fluid to the outside, a valve disc (3) having a pressing part (31) to arbitrarily open and close the flowout port, and a valve operating body (8) moving the pressing part of the valve disc, characterized in that, when flow is delivered from the flowout port, the flat surface of the pressing part of the valve disc closing the flowout port is inclined by the delivered flow from the flowout port. The valve disc is formed by proving support plates (32) made of elastic body, 180° apart from each other, at the lower end part of the pressing part into which a core (34) is fitted through the bottom part opening of a generally cylindrical packing (33), the pressing part and support plates are formed of elastic materials such as rubber, the width of the support plates should desirably be approximately the same as the outside diameter of the pressing part and, in order to allow the flat surface of the pressing part to be inclined by delivered flow, for example, the flowout port may be formed by shifting it from the center of the pressing part of the valve disc.

16 Claims, 7 Drawing Sheets

FLOW CONTROL VALVE

TECHNICAL FIELD

The present invention relates to an electromagnetic valve for a flow control which is used as a constant speed air release valve for a blood pressure valve or the like, and particularly to a flow control valve which has a simple structure and can gradually increase an air volume displacement.

BACKGROUND ART

Various kinds of blood pressure gauges are proposed, however, there is a blood pressure gauge structured such as to feed an air to a cuff wound around an arm of a person under measurement of blood pressure by a pump, increase a pressure within the cuff to a predetermined value, thereafter gradually reduce the pressure and measure the blood pressure in a pressure reducing step. The structure is made such as to reduce the pressure within the cuff after measuring the blood pressure so as to release a feeling of pressure applied to the arm of the person under measurement of blood pressure, and take out the cuff from the arm.

In the flow control valve of the blood pressure gauge mentioned above, it is important to gradually reduce the pressure within the pressurized cuff, and accordingly it is necessary to gradually increase a size of a pressure outflow port communicated with the cuff. A representative flow control valve as mentioned above is described in Japanese Unexamined Patent Publication No. 6-47007. The flow control valve is constituted by an air outflow port communicated with the cuff, a packing closing the outflow port and mounted to a front end of a movable shaft, and a solenoid driving the movable shaft in an axial direction.

The flow control valve described in the publication mentioned above is structured such that the air outflow port and respective end surfaces of the packing are formed in a flat surface having no parallel relation to each other, and the air outflow port is opened not all at once but step by step by gradually moving the packing apart from the air outflow port. The structure is made such as to cut an electric current of a solenoid so as to press down the movable shaft by a spring after the measurement of the blood pressure is finished by reducing the pressure within the cuff to a predetermined value, thereby quickly reducing the pressure within the cuff to an atmospheric pressure.

However, the flow control valve described in the publication mentioned above is structured such that any one of an end surface of the air outflow port or an end surface of the packing is slightly inclined with respect to a moving direction of a sliding shaft, however, an outflow amount of air is affected by an attitude of the packing. Accordingly, it is necessary to precisely adjust an angle of incline of the air outflow port and the respective end surfaces of the packing, and it is necessary to adjust so that the attitude of the movable shaft smoothly moves without changing.

Accordingly, an object of the present invention is to provide a flow amount control valve structured such as to gradually increase an air outflow amount while having a simple structure.

Further, an object of the present invention is to provide a flow control valve which can intend to achieve a cost cutting by reducing a number of parts.

Further, an object of the present invention is to provide a flow control valve which can control a little amount discharge.

DISCLOSURE OF THE INVENTION

A flow control valve in accordance with the present invention is constituted by an outflow port for flowing out a pressurized fluid to an external portion, a valve body having a pressure contact portion for optionally opening and closing the outflow port, and a valve operating body for moving the pressure contact portion of the valve body, characterized in that a flat surface of the pressure contact portion of the valve body closing the outflow port is formed so as to be inclined by a discharge air from the outflow port.

Further, the valve body is provided with supporting plates in a lower end portion of the pressure contact portion to which a core is fitted and inserted from a bottom opening of a substantially cylindrical packing, at an angle of 180 degrees therefrom. The substantially cylindrical packing and the supporting plates are integrally formed by an elastic member such as a rubber, a plastic or the like. It is preferable that a width of the supporting plate is set to be substantially the same as an outer diameter of the pressure contact portion.

At a time of discharging the air from the outflow port, in order to incline the flat surface of the pressure contact portion in the valve body by the discharge air from the outflow port, the structure may be formed so as to shift a center of the outflow port from a center of the pressure contact portion in the valve body. In order to shift the center of the outflow port from the center of the pressure contact in the valve body, for example, the outflow port may be formed so as to be shifted from an axis of a connection pipe communicated with the cuff, or one of the supporting plates in the valve body may be formed shorter than another so as to be shifted from the center of the pressure contact portion.

Further, at a time of discharging the air from the outflow port, in order to incline the flat surface of the pressure contact portion in the valve body by the discharge air from the outflow port, the structure may be formed so as to make a thickness of one of the supporting plates in the valve body smaller than that of another, or fit and insert the core at a position shifted from the center of the cylindrical packing, thereby making a spring action of one of the supporting plates smaller than that of another.

In the case of forming the outflow port so as to shift from the axis of the connection pipe communicated with the cuff, the discharge air is brought into contact with the position shifted from the center of the pressure contact portion, so that the flat surface of the pressure contact portion is inclined. Further, if one of the supporting plates of the valve body is formed shorter than another, the outflow port is shifted from the center of the pressure contact portion, and a difference is generated in the spring action of the supporting plates, so that the flat surface of the pressure contact portion is inclined by the discharge air.

Further, in the case of forming the thickness of one of the supporting plates in the valve body smaller than the thickness of another, or in the case of fitting and inserting the core so as to shift from the center of the cylindrical packing in the valve body, the spring action of one supporting plate becomes weaker than the spring action of another supporting plate, so that the flat surface of the pressure contact portion in the valve body tends to be inclined by the discharge air from the outflow port.

Further, grooves or slits may be formed in the supporting plates of the valve body. By forming the grooves or the slits, the spring action of the supporting plates becomes small, and it is possible to restrict a back action even in the case that a pressure of the discharge air from the outflow port becomes small. Accordingly, it is possible to maintain the incline of the flat surface of the pressure contact portion in the valve body for a long time, and it is possible to further precisely control the discharge air.

The grooves or the slits formed in the supporting plates in the valve body may be symmetrically or asymmetrically formed in both sides of the pressure contact portion. Further, a shape of the groove or the slit is not particularly limited, may be formed in a circular arc shape, may be formed in a right angle direction with respect to side surfaces of the supporting plates, or may be formed in an oblique direction with respect to the side surfaces of the supporting plates.

BEST MODE FOR CARRYING OUT THE INVENTION

Figure 1:
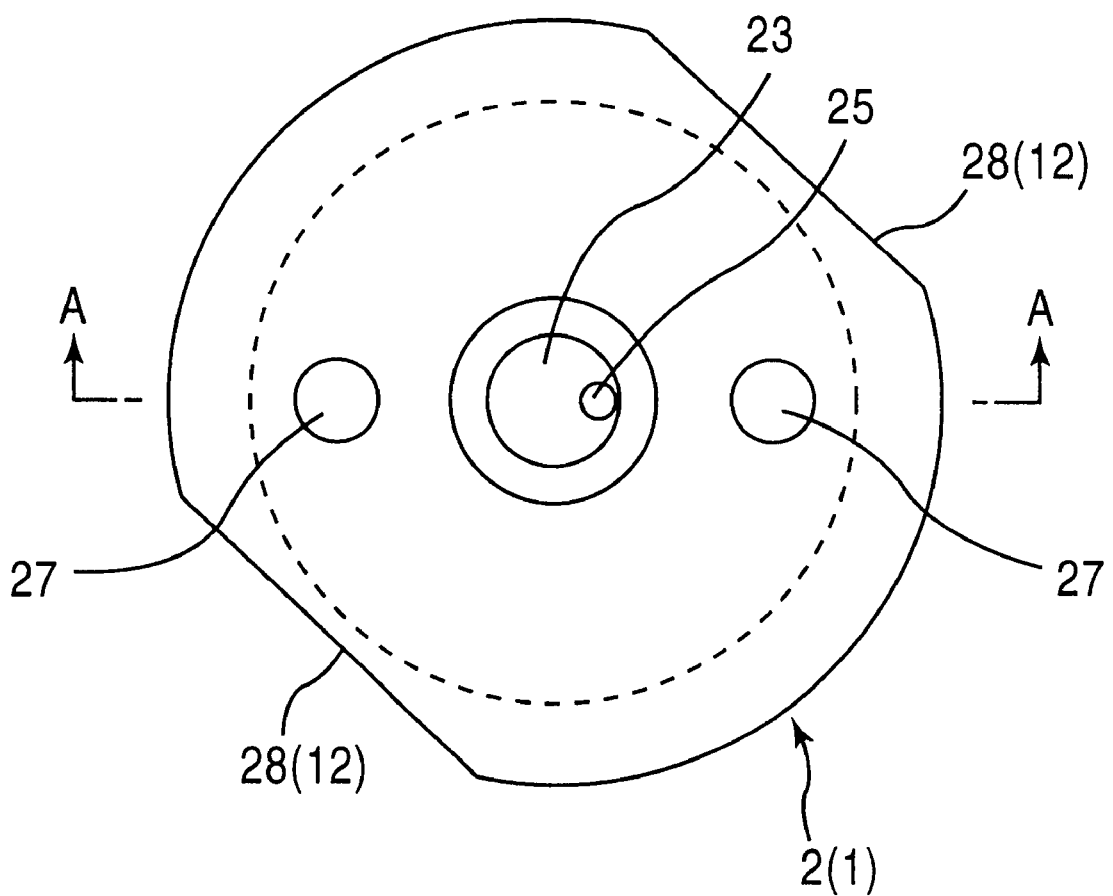
FIG. 1 is a plan view showing a flow control valve in accordance with a first embodiment of the present invention.
Figure 2:
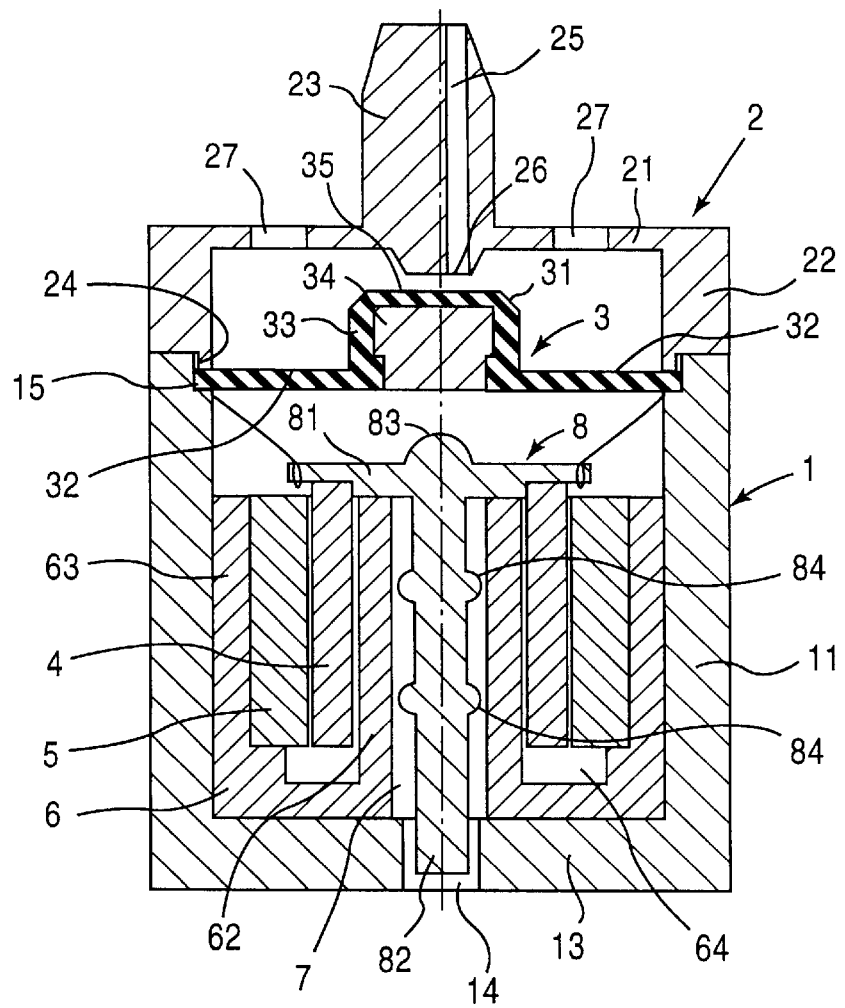
FIG. 2 is a cross sectional view along a line A—A in FIG. 1.
Figure 3:
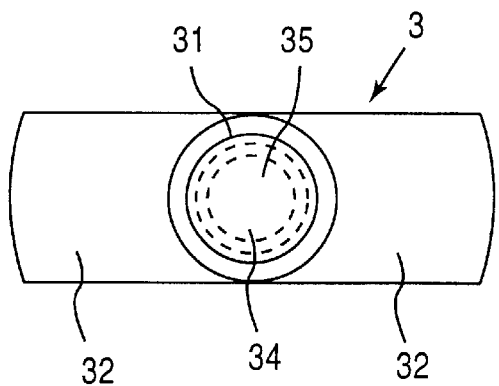
FIG. 3 is a plan view of a valve body.

A description will be given in detail of the present invention on the basis of embodiments illustrated below. FIGS. 1 to 3 show a first embodiment of a preferable flow control valve in accordance with the present invention. A whole structure of the flow control valve is made such that both end portions of a valve body 3 formed in a substantially rectangular shape in a plan view are held between a cylindrical casing 1 and a lid body 2, and a cylindrical receiving body 6 for receiving a solenoid 4 and a magnet 5 is arranged within a casing 1. The structure is made by movably fitting and inserting a valve operating body 8 pressing up the valve body 3 to a through hole 7 of the receiving body 6.

Further, describing in detail, cut-off flat surfaces 12 and 12 are provided in side surfaces of a peripheral wall 11 of the cylindrical casing 1 in parallel so as to oppose to each other. Further, a through hole 14 inserting and passing an end portion of the valve operating body 8 therethrough is provided in a center of a bottom portion 13 in the casing 1, and a step portion 15 is formed in an inner side of an upper opening portion. On the contrary, the lid body 2 is constituted by an upper plate 21 and a peripheral wall 22, and a connection pipe 23 communicated with a cuff is protruded from a center portion of an upper plate 21 in a moving direction of the valve operating body 8. A convex portion 24 fitted to the step portion 15 is provided in an inner side of a lower end in the peripheral wall 22.

An outflow port 26 of an outflow passage provided in the connection pipe 23 protrudes from a lower surface of the upper plate 21. Discharge ports 27 and 27 are provided in the upper plate 21 at positions at an angle of 180 degrees with respect to the connection pipe 23, and cut-off flat surfaces 28 are provided in the side surfaces of the peripheral wall 22 in parallel so as to oppose to each other. The flat surfaces 28 are formed so as to coincide with the flat surfaces 12 of the casing 1 at a time of being assembled with the casing 1.

An outflow port 26 of an outflow passage provided in the connection pipe 23 protrudes from a lower surface of the upper plate 21. Discharge ports 27 and 27 are provided in the upper plate 21 at positions at an angle of 180 degrees with respect to the connection pipe 23, and cut-off flat surfaces 28 are provided in the side surfaces of the peripheral wall 22 in parallel so as to oppose to each other. The flat surfaces 28 are formed so as to coincide with the flat surfaces 12 of the casing 1 at a time of being assembled with the casing 1.

Further, an axis of the connection pipe 23 and an axis of the valve operating body 8 are substantially the same, however, a center of the outflow passage 25 is formed so as to be shifted from a center of the connection pipe 23, and it is preferable to set a shifting direction to a longitudinal direction of the valve body 3 mentioned below.

The valve body 3 is structured, as shown in FIG. 3, such that supporting plates 32 and 32 are provided in a lower end portion of a substantially cylindrical pressure contact portion 31 in a right angle direction with respect to a side surface of the pressure contact portion 31 at an angle of 180 degrees. The pressure contact portion 31 is formed by fitting and inserting a core 34 from an opening of a bottom portion in a cylindrical packing 33. The pressure contact portion 31 is formed by fitting and inserting the core 34 from the opening of the bottom portion in a cylindrical packing 33.

The supporting plates 32 and the cylindrical packing 33 are integrally formed by an elastic member such as a rubber, a plastic or the like. The supporting plates 32 and 32 have substantially the same thickness, and it is preferable to set a width thereof to be substantially the same size as an outer diameter of the pressure contact portion. End portions of the supporting plates 32 and 32 are gripped with respect to the peripheral wall 22 of the lid body 2 in a state of being bridged over the step portion of the upper opening portion in the cylindrical casing 1.

An axis of the pressure contact portion and an axis of the connection pipe 23 exist on substantially the same line. A surface 35 being in pressure contact with the outflow port 26 in the cylindrical packing 33 is formed in a flat surface 35, and is arranged substantially in parallel to the outflow port 26. In the valve body 3, since the supporting plates 32 and 32 are formed by the elastic member as mentioned above, the supporting plates 32 and 32 extends so as to pressure contact the flat surface 35 of the cylindrical packing 33 with the outflow port 26 and close the outflow port 26 when the core 34 is pressed up from a lower portion in FIG. 2. The axis of the pressure contact portion 31 and the axis of the connection pipe 23 exist on substantially the same line, however, since the outflow passage 25 is formed so as to be shifted from the axis of the connection pipe 23, the outflow port 26 is in pressure contact with the position shifted from the axis of the cylindrical packing 33.

Next, the solenoid 4 for moving the valve operating body 8 to an upper portion in FIG. 2, and the magnet 5 arranged in an outer side of the solenoid 4 are arranged in the cylindrical receiving body 6 received in the casing 1. The cylindrical receiving body 6 has a double structure constituted by an inner wall 62 and an outer wall 63, an inner side of the inner wall 62 is constituted by the through hole 7 extending therethrough in an axial direction, and a portion between the inner wall 62 and the outer wall 63 is constituted by an annular groove 64. The solenoid 4 and the magnet 5 are received in the annular groove 64.

The valve operating body 8 is formed by a flange portion 81 slightly extending in a diametrical direction from the solenoid 4, and a sliding shaft 82. A hemispheric convex portion 83 is provided on an axis of the sliding shaft 82 in a protruding manner, in a center portion of an upper surface in the flange portion 81. An annular convex portion 84 preventing a play from being generated with respect to the through hole 7 is provided on an outer peripheral surface of the sliding shaft 82. When an electric current is applied to the solenoid 4, an electromagnetic force is generated and the valve operating body 8 moves, the convex portion 83 is brought into contact with the core 34. Further, the outflow port 26 is closed by the cylindrical packing 33 by pressing up the pressure contact portion 31 to the upper portion in FIG. 2.

Figure 4:
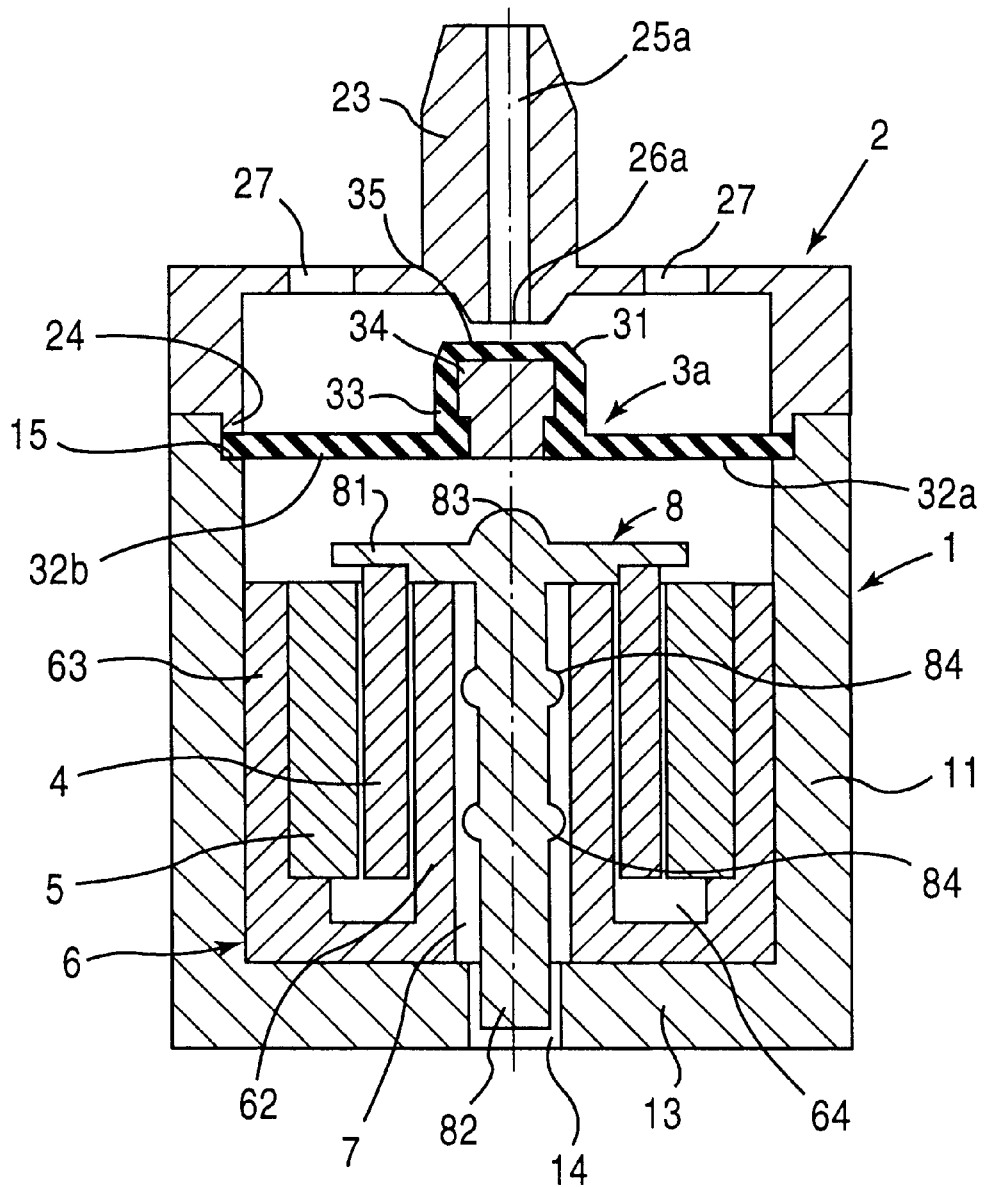
FIG. 4 is a cross sectional view showing a flow control valve in accordance with a second embodiment of the present invention.

FIG. 4 shows a second embodiment in accordance with the present invention. This embodiment is characterized in that the center of the valve body is formed so as to be shifted from the centers of the outflow port in the connection pipe and the convex portion in the valve operating valve. That is, centers of an outflow port 26a of an outflow passage 25a provided in the center of the connection pipe 23 and the convex portion 83 of the valve operating body 8 are provided on the same line in a vertical direction. At this time, it is preferable that axes of the outflow passage 25a and the sliding shaft 82 are provided on substantially the same line as the centers of the outflow port 26a and the convex portion 83.

Further, the center of the pressure contact portion 31 constituting the valve body 3a is provided so as to be shifted from the centers of the outflow port 26a and the convex portion 83. A shifting direction of the center of the pressure contact portion 31 is any one side of the supporting plates 32 formed in both sides of the pressure contact portion 31 at an angle of 180 degrees. In FIG. 4, a supporting plate 32b is formed short, and a supporting plate 32a is formed long. Accordingly, the supporting plate in the direction in which the pressure contact portion 31 is shifted is formed short, and the supporting plate in the opposite side is formed long. In FIG. 4, a right side is formed long and a left side is formed short. In this case, since the other structures than the valve body 3a and the outflow port 26a are the same as the structures of the first embodiment, the same reference numerals are attached to the same structures, and a description thereof will be omitted.

In the second embodiment mentioned above, when gradually moving down the valve operating body 8 from a state in which the outflow port 26a is completely closed, to a lower portion in FIG. 4, the flat surface 35 of the pressure contact portion 31 is inclined by the air discharged through the outflow passage 25a so as to have a non-parallel relation to the lower end surface of the outflow port 26a, because the outflow port 26a is shifted from the center of the pressure contact portion 31, one supporting plate is long and the spring action becomes small. When gradually moving down the valve operating body 8 further, the flat surface 35 gradually moves apart from the outflow port 26a in the state in which the flat surface 35 is inclined, so that it is possible to discharge the air at a small speed.

Figure 5:
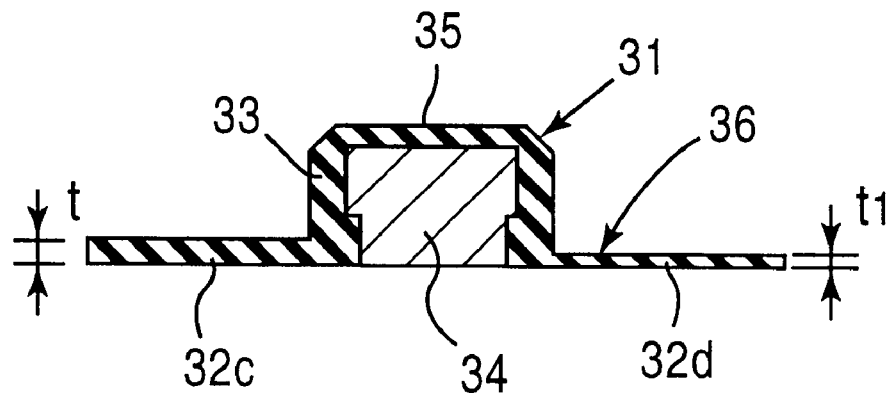
FIG. 5 is a cross sectional view showing a valve body in a flow control valve in accordance with a third embodiment of the present invention.

FIG. 5 is a cross sectional view showing only a valve body of a flow amount control valve in accordance with a third embodiment of the present invention. Since the other structures are the same as those in FIG. 4, a description of a whole will be omitted. This embodiment is characterized in that one of the supporting plates constituting the valve body is formed so as to be thin. That is, in the same manner as that of the second embodiment, the structure is made such that supporting plates 32c and 32d made of an elastic member such as a rubber or the like are provided in the lower end portion of the substantially cylindrical pressure contact portion 31 at an angle of 180 degrees in a right angle direction with respect to the side surface of the pressure contact portion 31. A thickness t1 of the supporting plate 32d is made smaller than a thickness t of the supporting plate 32c, thereby reducing the spring action. The center of the pressure contact portion 31 in accordance with the third embodiment is arranged on substantially the same line as that of the centers of the outflow port 26a and the convex portion 83.

Figure 6:
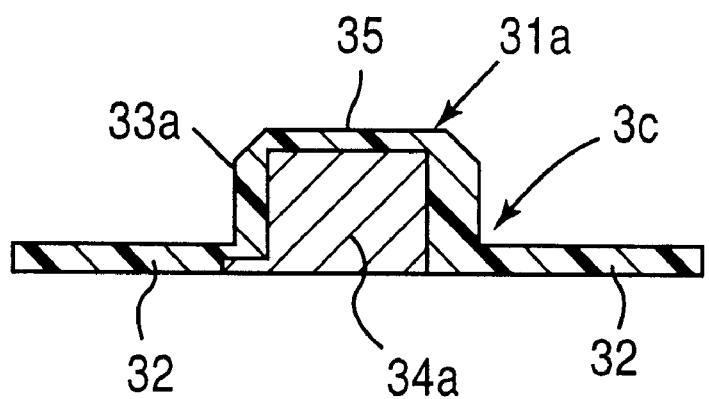
FIG. 6 is a cross sectional view showing a valve body in a flow control valve in accordance with a fourth embodiment of the present invention.

Further, FIG. 6 is a cross sectional view showing only a valve body of a flow amount control valve in accordance with a fourth embodiment of the present invention. Since the other structures are the same as those in FIG. 4, a description of a whole will be omitted. This embodiment is structured such that a core 34a of a pressure contact portion 31a is shifted to a side of one of the supporting plates, thereby reducing the spring action of another supporting plate. That is, in the same manner as that of the first to third embodiments, the structure is made such that supporting plates 32 and 32 made of an elastic member such as a rubber or the like are provided in the lower end portion of the substantially cylindrical pressure contact portion 31a at an angle of 180 degrees in a horizontal direction. The pressure contact portion 31a is formed by fitting and inserting the core 34a to the cylindrical packing 33a in which a bottom portion is open. A peripheral wall of the cylindrical packing 33a is structured such that a side of one of the supporting plates is formed so as to be thick, and a side of another is formed so as to be thin, and the center of the bottom opening is shifted. Accordingly, the spring action of one of the supporting plates becomes small by fitting and inserting the core 34a.

In accordance with the third and fourth embodiments mentioned above, in the same manner as that of the first and second embodiments, when gradually moving down the valve operating body 8 from a state in which the outflow port 26a is completely closed, the flat surface 35 of the pressure contact portion 31 or 31a is inclined by the air discharged through the outflow passage 25 so as to have a non-parallel relation to the lower end surface of the outflow port 31, because the structure is made such that the spring action of one of the supporting plates is small. Since the flat surface 35 gradually moves apart from the outflow port 26 in the state in which the flat surface 35 is inclined, it is possible to discharge the air at a small speed.

Figure 7:
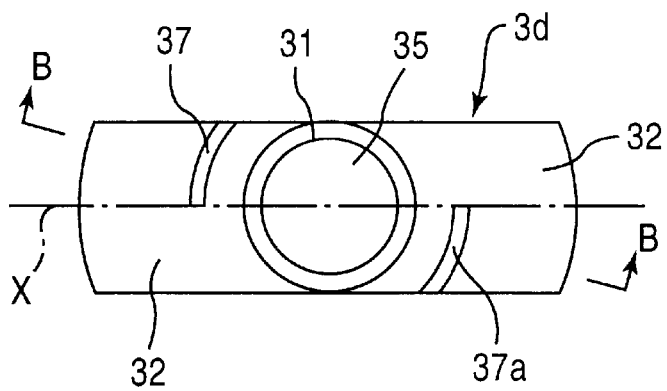
FIG. 7 is a plan view showing a valve body in a flow control valve in accordance with a fifth embodiment.
Figure 8:
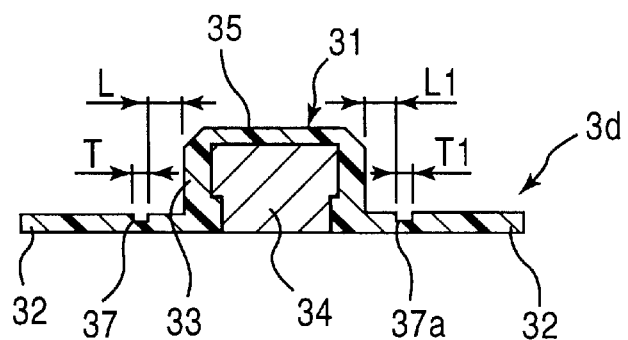
FIG. 8 is a cross sectional view along a line B—B in FIG. 7.

Further, FIGS. 7 and 8 are a plan view and a cross sectional view showing only a valve body 3d of a flow amount control valve in accordance with a fifth embodiment of the present invention. The same reference numerals are attached to the same structures as those of the embodiments mentioned above, and a description thereof will be omitted. In the embodiments on and after FIG. 7, the spring action of one of the supporting plates is made smaller than that of another by forming grooves or slits in the supporting plates 32.

That is, in the same manner as that of the first embodiment, the structure is made such that supporting plates 32 and 32 made of an elastic member such as a rubber or the like are provided in the lower end portion of the substantially cylindrical pressure contact portion 31 at an angle of 180 degrees in a horizontal direction. The pressure contact portion 31 is formed by fitting and inserting the core 34 to the cylindrical packing 33 in which a bottom portion is open. Circular arc-shaped grooves 37 and 37a are provided on upper surfaces of the supporting plates 32 and 32. The circular arc shaped grooves 37 and 37a are provided in upper and lower portions of a center line X in a direction of the supporting plates 32 and 32 so as to be symmetric with respect to a point.

As shown in FIG. 8, when setting a gap of the groove 37 from the pressure contact portion 31 to L, setting a groove width to T, setting a gap of the groove 37a from the pressure contact portion 31 to L1 and setting a groove width to T1, a relation between L and T can be made as follows. That is, when a relation L=L1 is established, a relation T>T1 or T<T1 is established, and when a relation T=T1 is established, a relation L>L1 or L<L1 is established. As mentioned above, by giving a difference to the gap of the groove 37 or 37a from the pressure contact portion 31, or the groove width, it is possible to make the spring action of one of the supporting plates small and it is possible to restrict the back action to a small level.

Figure 9:
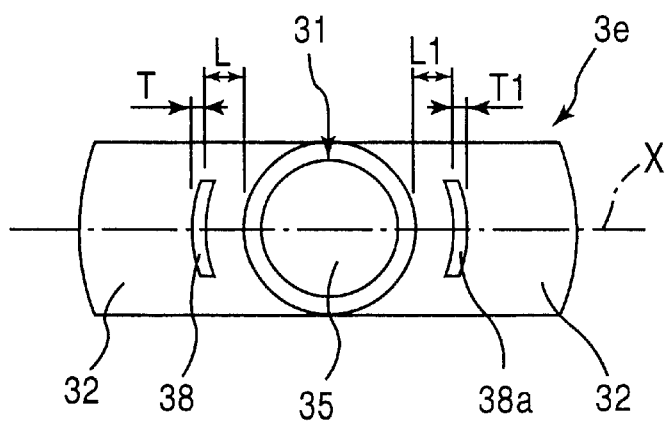
FIG. 9 is a plan view showing a valve body in a flow control valve in accordance with a sixth embodiment.

Next, FIG. 9 is a plan view showing only a valve body 3e of a flow control valve in accordance with a sixth embodiment of the present invention. This embodiment is structured such that a position of the groove is different from that of the fifth embodiment shown in FIG. 7. That is, grooves 38 and 38a provided on the upper surface of the supporting plates 32 are provided on the center line X in the direction of the supporting plates 32 and 32. When setting a gap of the groove 38 from the pressure contact portion 31 to L, setting a groove width to T, setting a gap of the groove 38a from the pressure contact portion 31 to L1 and setting a groove width to T1, a relation between L and T is the same as that of the embodiment shown in FIG. 7. Accordingly, a detailed description thereof will be omitted.

Figure 10:
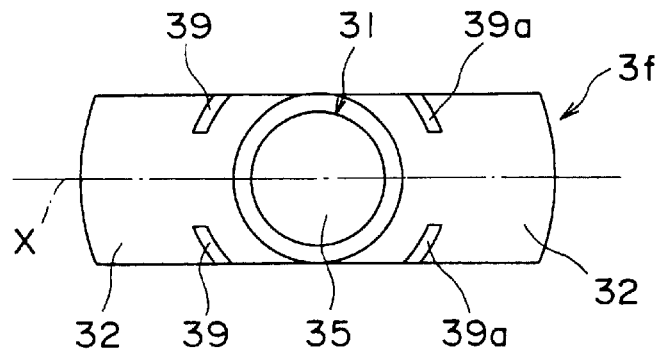
FIG. 10 is a plan view showing a valve body in a flow control valve in accordance with a seventh embodiment.

FIG. 10 is a plan view showing only a valve body 3f of a flow control valve in accordance with a seventh embodiment of the present invention. This embodiment is structured such that grooves 39 and 39a are provided in a symmetrical manner so as to be separated into both sides of the center line X in the direction of the supporting plates 32 and 32. A relation between gaps and widths of the grooves 39 and 39a from the pressure contact portion 31 is the same as that of the case of the fifth embodiment and the sixth embodiment mentioned above. Accordingly, a detailed description thereof will be omitted.

Figure 11:
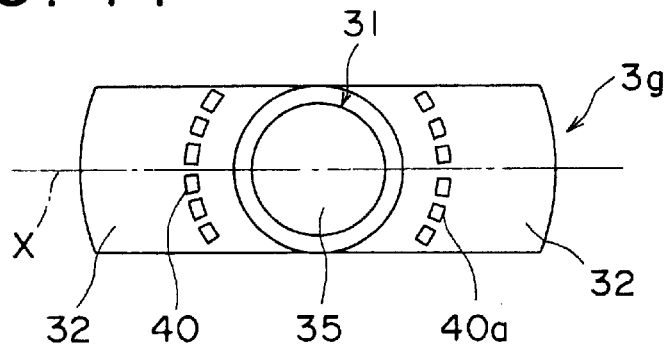
FIG. 11 is a plan view showing a valve body in a flow control valve in accordance with an eighth embodiment.

FIG. 11 is a plan view showing only a valve body 3g of a flow control valve in accordance with an eighth embodiment of the present invention. This embodiment is different from the embodiments mentioned above in a point that grooves 40 and 40a are provided in a dotted line shape. A relation between gaps and widths of the grooves 40 and 40a from the pressure contact portion 31 is the same as that of the case of the fifth embodiment and the sixth embodiment mentioned above. Accordingly, a detailed description thereof will be omitted.

Figure 12:
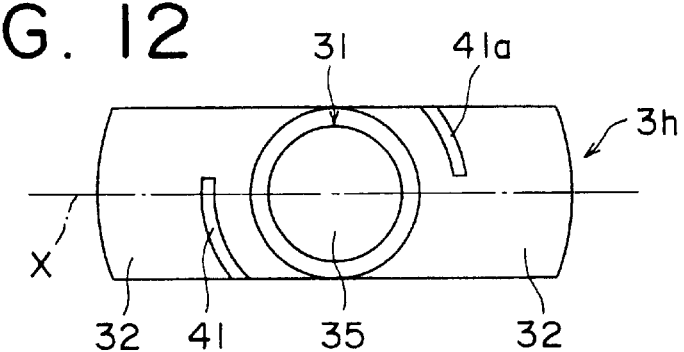
FIG. 12 is a plan view showing a valve body in a flow control valve in accordance with a ninth embodiment.

FIG. 12 is a plan view showing only a valve body 3h of a flow control valve in accordance with a ninth embodiment of the present invention. This embodiment is different in a point that grooves 41 and 41a are asymmetrically provided in both sides of the center line X of the supporting plates 32 and 32a. That is, the structure is made such that a length of the groove 41 is longer than that of the groove 41a. Gaps and widths of the grooves 41 and 41a from the pressure contact portion 31 are the same, however, the spring action of one of the supporting plates is made small by giving a difference to their lengths.

Figure 13:
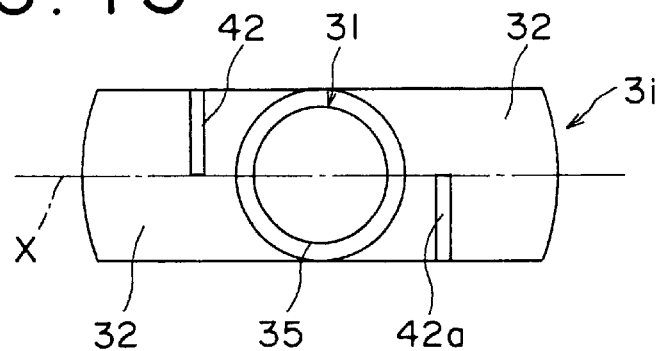
FIG. 13 is a plan view showing a valve body in a flow control valve in accordance with a tenth embodiment.

Further, FIG. 13 is a plan view showing only a valve body 3i of a flow control valve in accordance with a tenth embodiment of the present invention. This embodiment is different in a point that grooves 42 and 42a are provided in a right angle direction with respect to the side surfaces of the supporting plates 32 and 32. A relation between gaps and widths of the grooves 42 and 42a from the pressure contact portion 31 is the same as that of the case of the fifth embodiment and the sixth embodiment mentioned above. Accordingly, a detailed description thereof will be omitted.

In this case, in the embodiments shown in FIGS. 7 to 13, the description is given of the case that the grooves are formed, however, the grooves in each of the embodiments can be changed to slits. In the case of changing to the slits, it is possible to make the spring action of one of the supporting plates small by giving a difference to a gap from the pressure contact portion 31 and/or a length of the slit, in the slits of any one of the supporting plates 32 and 32. As mentioned above, it is possible to sensitively respond to the air pressure discharged from the outflow port 26a by forming the grooves or the slits in the supporting plates 32 and 32. Accordingly, even in the case that the air pressure becomes weak, the back action of the supporting plates 32 and 32 is a little, and it is possible to maintain the inclined surface of the flat surface 35 long.

Further, the grooves or the slits shown in the embodiments on and after FIG. 7 can be realized by combining with the first to fourth embodiments shown before FIG. 6. In the case of realizing in combination with the first to fourth embodiments, since one of the supporting plates 32 and 32 already has the small spring action and is easily deflected, the grooves or the slits may be formed in symmetrical.

Figure 14:
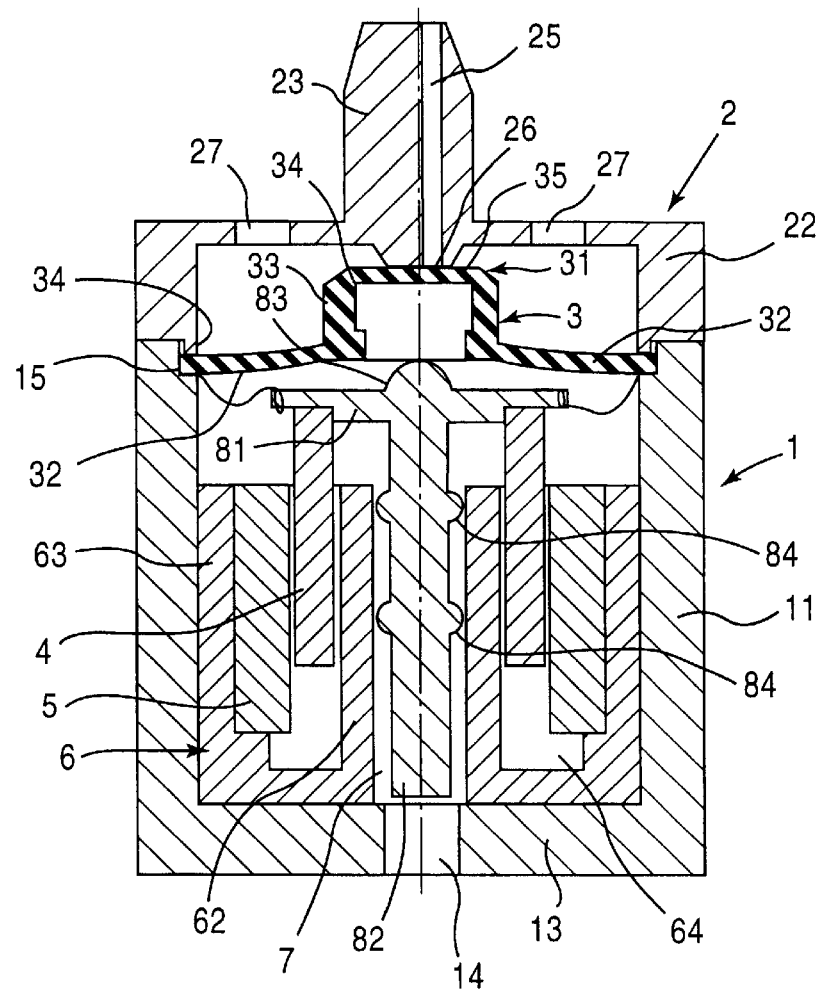
FIG. 14 is a cross sectional view showing a closing state of an outflow port by the valve body.

A description will be given of an operation of the flow control valve in accordance with the first embodiment shown in FIG. 2 with reference to FIGS. 14 and 15. At first, a predetermined electric current is applied to the solenoid 4 so as to generate an electromagnetic force, thereby moving the valve operating body 8 to an upper portion in FIG. 14. When the valve operating body 8 moves upward, the convex portion 83 is brought into contact with the core 34 of the valve body 3 so as to press up the valve body 3 against the spring action of the supporting plates 32 and 32, thereby pressure contacting the flat surface 35 of the cylindrical packing 33 with the outflow port 26 so as to completely close.

Thereafter, the supply electric current of the solenoid is reduced little by little, and an air discharge step of the blood pressure gauge is started. Since the electromagnetic force breaks down in correspondence to the reduction of electric current, the valve operating body 8 is gradually pressed down to the lower portion in FIG. 14 by the spring action of the supporting plates 32 and 32. The valve operating body 8 is pressed down, whereby the outflow port 26 is gradually opened, however, since the outflow port 26 is shifted from the center of the pressure contact portion 31, and the convex portion 83 is brought into contact with the center of the pressure contact portion 31, the flat surface 35 is slightly inclined by the discharge air. It is possible to precisely control the discharge air due to the incline.

Figure 15A:
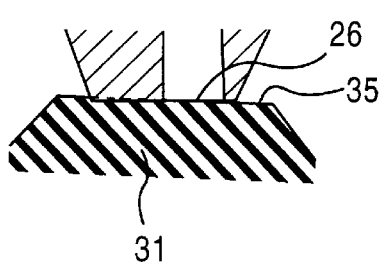
FIG. 15 is a schematic view showing a relation between the outflow port and a pressure contact portion of the valve body.
Figure 15B:
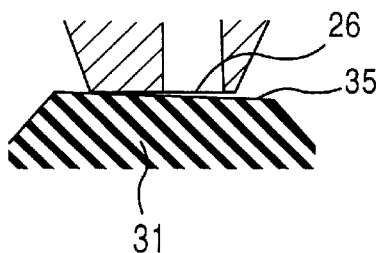

FIG. 15(*a*) shows a moment at which the pressure contact portion 31 is going to open the outflow port 26, and FIG. 15(*b*) shows a matter that the flat surface 35 of the pressure contact portion 31 is inclined and the air is gradually discharged from the right side in the drawing. As mentioned above, the valve operating body 8 is pressed down due to the spring action of the supporting plates by gradually breaking down the electromagnetic force of the solenoid 4, and the closed air is gradually discharged. When stopping the supply of the electric current to the solenoid 4 after reducing the pressure within the cuff to the predetermined value, the outflow port is quickly opened due to the spring action of the supporting plates 32 and 32, whereby it is possible to quickly reduce the pressure within the cuff to the atmospheric pressure.

The flow control valves on and after the second embodiment are also operated in the same manner as that of the first embodiment mentioned above, and show the air discharge property in which the air discharge amount is gradually increased. A detailed description thereof will be omitted. Further, when combining the first to fourth embodiments with the embodiments on and after the fifth embodiment, it is possible to restrict the back action so as to maintain the incline of the pressure contact portion long.

As is apparent from the description mentioned above, since the flow control valve in accordance with the present invention is structured such that the outflow port and the flat surface of the pressure contact portion closing the outflow port are formed in parallel to each other, it is possible to close by a little pressing force. On the contrary, when opening the outflow port, the structure is made such as to incline the flat surface of the pressure contact portion due to the discharge air from the outflow port. Accordingly, the outflow port is gradually opened in correspondence to the movement of the pressure contact portion, and it is possible to precisely and continuously control the discharge air amount. Further, since the supporting plates of the valve body have the spring action, it is possible to incline the flat surface of the pressure contact portion due to the discharge air from the outflow port, and it is possible to move the valve operating body, so that the coil spring for moving the valve operating body used in the conventional art is not required. Accordingly, it is possible to reduce the number of the parts as a whole, and it is possible to achieve a cost cutting. Further, in the case of applying the flow control valve in accordance with the present invention to the blood pressure gauge, it is possible to precisely control the discharge air flow amount.

What is claimed is:

1. A flow control valve comprising a casing, a lid body, an outflow port for flowing out a pressurized fluid to an external portion, a valve body having a pressure contact portion for optionally opening and closing said outflow port, and a valve operating body for moving the pressure contact portion of said valve body, characterized in that the valve body is provided with supporting plates in a lower end portion of the pressure contact portion, at an angle of 180 degrees therefrom, connected to, between and in contact with the casing and the lid body and said pressure contact portion is structured such that a core is fitted and inserted from a bottom opening of a substantially cylindrical packing integrally formed with the supporting plates by an elastic member, and a flat surface of the pressure contact portion of the valve body is formed so as to be inclined by a discharge air from the outflow port.

2. A flow control valve comprising an outflow port for flowing out a pressurized fluid to an external portion, a valve body having a pressure contact portion for optionally opening and closing said outflow port, and a valve operating body for moving the pressure contact portion of said valve body, characterized in that the valve body is provided with supporting plates in a lower end portion of the pressure contact portion, at an angle of 180 degrees therefrom, and said pressure contact portion is structured such that a core is fitted and inserted from a bottom opening of a substantially cylindrical packing integrally formed with the supporting plates by an elastic member, and a flat surface of the pressure contact portion of the valve body is formed so as to be inclined by a discharge air from the outflow port, wherein a width of said supporting plates is substantially the same as an outer diameter of said pressure contact portion.

3. A flow control valve as claimed in claim 1 or 2, characterized in that the flat surface of the contact pressure portion in the valve body is inclined due to the discharge air from the outflow port by forming said outflow port so as to be shifted from a center of the pressure contact portion.

4. A flow control valve as claimed in claim 1 or 2, characterized in that a center of the outflow port is shifted from a center of the pressure contact portion in the valve body by forming said outflow port so as to be shifted from an axis of a connection pipe communicated with a cuff.

5. A flow control valve as claimed in claim 1 or 2, characterized in that a center of the pressure contact portion is shifted to a side of one of the supporting plates from a center of the outflow port by forming one of the supporting plates in said valve body shorter than another.

6. A flow control valve as claimed in claim 1 or 2, characterized in that the flat surface of the pressure contact portion in the valve body is inclined due to the discharge air from the outflow port by forming a thickness of one of the supporting plates in said valve body smaller than that of another.

7. A flow control valve as claimed in claim 1 or 2, characterized in that the flat surface of the pressure contact portion in the valve body is inclined due to the discharge air from the outflow port by shifting a center of a core fitted and inserted to a substantially cylindrical pressure contact portion in said valve body from a center of said pressure contact portion.

8. A flow control valve as claimed in claim 1 or 2, characterized in that grooves or slits are formed in the supporting plates of said valve body.

9. A flow control valve as claimed in claim 1 or 2, characterized in that grooves or slits are formed in the supporting plates of said valve body, and said grooves or said slits are symmetrically formed in both sides of the pressure contact portion.

10. A flow control valve as claimed in claim 1 or 2, characterized in that grooves or slits are formed in the supporting plates of said valve body, and said grooves or said slits are asymmetrically formed in both sides of the pressure contact position.

11. A flow control valve as claims in claim 1 or 2, characterized in that grooves or slits are formed in the supporting plates of said valve body, and said grooves or said slits are formed in a circular arc shape.

12. A flow control valve as claimed in claim 1 or 2, characterized in that grooves or slits are formed in the supporting plates of said valve body, and said grooves or said slits are formed in a right angle direction with respect to side surfaces of the supporting plates.

13. A flow control valve as claimed in claim 1 or 2, characterized in that grooves or slits are formed in the supporting plates of said valve body, and said grooves or said slits are formed in an oblique direction with respect to side surface of the supporting plates.

14. A flow control valve as claimed in claim 1 or 2, characterized in that grooves or slits are formed in the supporting plates of said valve body, and said grooves or said slits are formed in a circular arc shape and symmetrically or asymmetrically formed in both sides of the pressure contact portion.

15. A flow control valve as claimed in claim 1 or 2, characterized in that grooves or slits are formed in the supporting plates of said valve body, and said grooves or said slits are formed in a right angle direction and symmetrically or asymmetrically formed in both sides of the pressure contact portion.

16. A flow control valve as claimed in claim 1 or 2, characterized in that grooves or slits are formed in the supporting plates of said valve body, and said grooves or said slits are formed in an oblique direction and symmetrically or asymmetrically formed in both sides of the pressure contact portion.

* * * * *